(12) United States Patent
Tiberghien et al.

(10) Patent No.: US 9,102,004 B2
(45) Date of Patent: Aug. 11, 2015

(54) FAMILY OF PLIERS FOR CLAMPING PLATES HAVING SIMILAR AND PREFERABLY IDENTICAL FRAMES, AND PLIERS FROM SUCH FAMILY

(75) Inventors: Olivier Tiberghien, St-Cyr-sur-Loire (FR); Daniel Chevassu, Chateau-du-Loir (FR)

(73) Assignee: Aro Welding Technologies, Chateau Due Loir (FR)

( * ) Notice: Subject to any disclaimer, the term of this patent is extended or adjusted under 35 U.S.C. 154(b) by 762 days.

(21) Appl. No.: 12/377,991

(22) PCT Filed: Oct. 24, 2007

(86) PCT No.: PCT/FR2007/052237
§ 371 (c)(1),
(2), (4) Date: Apr. 30, 2009

(87) PCT Pub. No.: WO2008/050065
PCT Pub. Date: May 2, 2008

(65) Prior Publication Data
US 2010/0257912 A1    Oct. 14, 2010

(30) Foreign Application Priority Data
Oct. 26, 2006 (FR) ...................................... 06 09434

(51) Int. Cl.
*B23K 11/31* (2006.01)
(52) U.S. Cl.
CPC ............. *B23K 11/314* (2013.01); *B23K 11/317* (2013.01); *B23K 11/318* (2013.01)
(58) Field of Classification Search
CPC ... B23K 11/314; B23K 11/317; B23K 11/318
USPC ................ 219/90; 269/32, 27, 228, 249, 143; 29/276
See application file for complete search history.

(56) References Cited

U.S. PATENT DOCUMENTS 5,750,953 A    5/1998   Sato et al.
6,100,497 A *  8/2000   Maruyama et al. ...... 219/121.63
(Continued)

FOREIGN PATENT DOCUMENTS

DE    198 01 652    7/1999
DE    102 49 201    5/2004
(Continued)

OTHER PUBLICATIONS

International Search Report from counterpart application No. PCT/FR2007/052237.
(Continued)

*Primary Examiner* — Kevin P Kerns
*Assistant Examiner* — Steven Ha
(74) *Attorney, Agent, or Firm* — Miller, Matthias & Hull LLP (57) ABSTRACT

The invention relates to pliers for clamping plates used in conjunction with a manipulator arm, comprising a rigid frame connected to a carrier such as a rigid stand or robot, and an articulation sub-assembly connected to the frame and comprising a fixed arm, a mobile arm, and a main actuator for displacing the mobile arm in translation or rotation relative to the fixed arm for closing or opening the pliers and respectively clamping the plate assembly between the arms or releasing said assembly, wherein said pliers belong to a family of pliers comprising C- and X-shaped pliers, the frame having a similar shape and appearance for all the pliers of said family. Application mainly in the family of C- and X-shaped resistance-welding pliers having similar and preferably identical frames.

13 Claims, 12 Drawing Sheets

(56) References Cited

U.S. PATENT DOCUMENTS

| | | | |
|---|---|---|---|
| 6,337,456 B1 * | 1/2002 | Taniguchi et al. | ......... 219/86.25 |
| 2009/0091149 A1 | 4/2009 | Chevassu et al. | |

FOREIGN PATENT DOCUMENTS

| | | | |
|---|---|---|---|
| DE | 102 49 201 A1 | | 5/2004 |
| EP | 0 151 819 | | 8/1985 |
| EP | 0 761 367 | | 3/1997 |
| EP | 1782909 A1 | * | 5/2007 |
| FR | 2 901 164 | | 5/2006 |
| JP | 62 016887 | | 1/1987 |
| JP | A-2000-141050 | | 9/1988 |
| JP | U1-S64-49380 | | 2/1989 |
| RU | 2044983 | | 4/1993 |

OTHER PUBLICATIONS

French Preliminary Search Report and Written Opinion from French Priority Application No. FR 0609434.

Chinese Office Action issued in related Chinese Application No. 200780032825.X; action dated Sep. 17, 2012.

Japanese Office Action issued in related Japanese Application No. 2009-533914; action dated Feb. 21, 2013.

\* cited by examiner

FAMILY OF PLIERS FOR CLAMPING PLATES HAVING SIMILAR AND PREFERABLY IDENTICAL FRAMES, AND PLIERS FROM SUCH FAMILY

CROSS-REFERENCE TO RELATED APPLICATIONS

This application is a U.S. national stage filing of International Patent Application No. PCT/FR2007/052237 filed on Oct. 24 2007, which claims priority under the Paris Convention to French Patent Application No. 06 09434, filed on Oct. 26, 2006.

FIELD OF THE DISCLOSURE

This invention relates to any type of clamp intended to grip sheet metal and used in association with a manipulating arm, called a robot. Said robot can be used either to move a clamp around the sheet assembly to be produced or, conversely, to move the assembly in front of a clamp, itself then attached to a rigid foot.

BACKGROUND OF THE DISCLOSURE

More specifically, this invention relates to electrical resistance welding clamps, of the general type including a rigid frame, associated with a support such as a rigid foot or a manipulating robot, a so-called articulation subassembly, associated with the frame and itself comprising a first so-called stationary arm, to which a first so-called stationary end is secured, a second so-called mobile arm, to which a second so-called mobile end is secured, and a main or welding actuator, bearing against said stationary arm so as to move the mobile arm (and end) with respect to the stationary arm (and end), according to a first degree of freedom, in translation or rotation, so as to close or open the clamp, in order, respectively, to grip a sheet metal assembly to be assembled between the stationary and mobile arms (and ends) (brought together by the actuator) or to release the sheet metal assembly, by separating the arms (and ends) from one another by the actuator.

Below, is described the principle of a welding clamp without the balancing/relief function as described in the French patent application 06 04384 filed in the name of the ARO company.

However, the problem remains identical in any type of clamp serving to grip a sheet metal assembly and integrating or not integrating an additional degree of freedom between the frame and the stationary arm so as to perform a balancing and relief operation.

Figure 1:
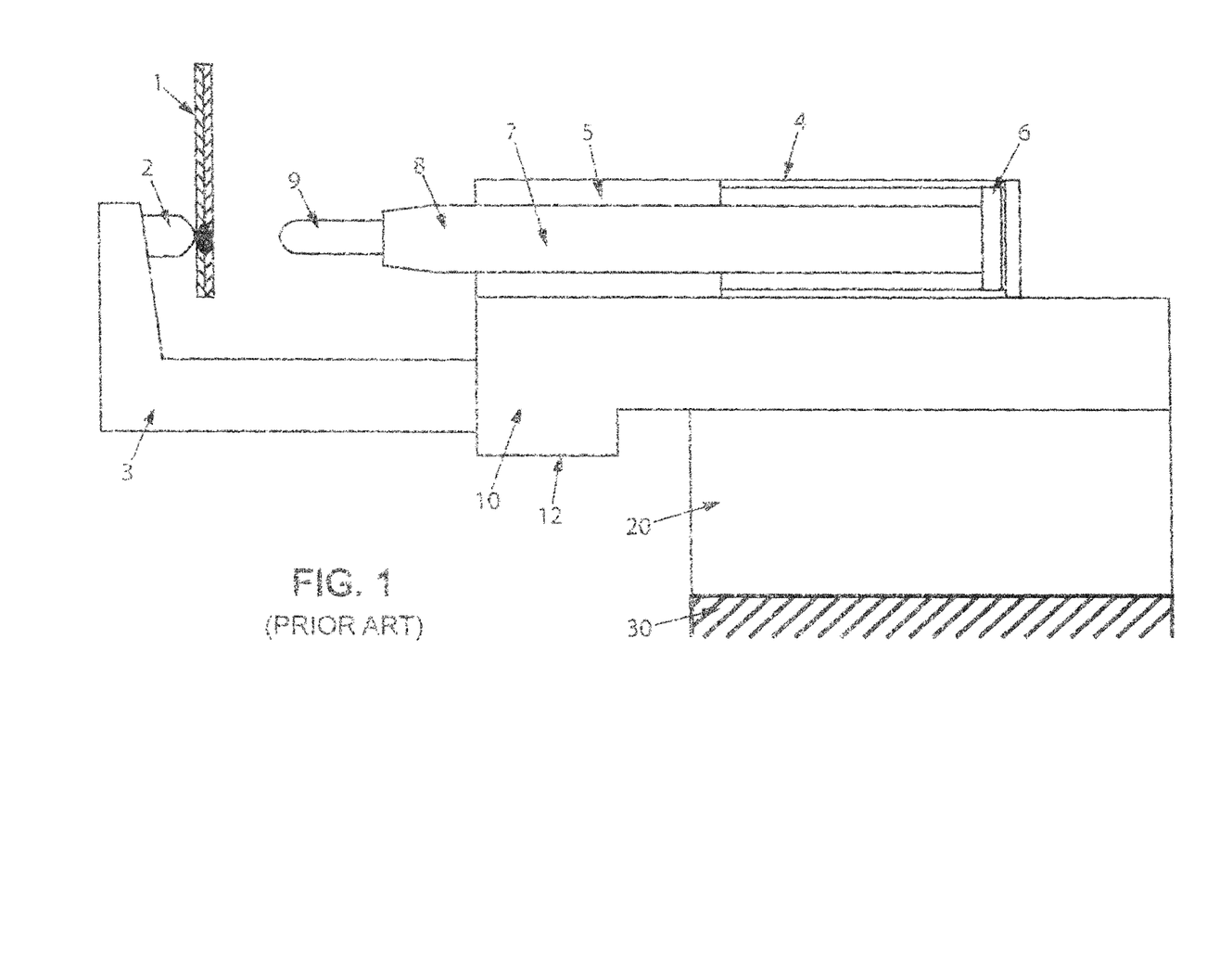
FIG. 1 is a diagrammatic view a diagrammatic lateral elevation view of a C-clamp of the prior art, already described above.

In the electrical resistance welding clamps of the prior art, depending on the work to be performed, two kinematics are possible for the mobile arm and end:

the first degree of freedom is a translation of the mobile arm and end with respect to the stationary arm holding the stationary end, by linear guidance provided by the welding actuator, which is a linear actuator of any suitable known type, i.e. hydraulic, pneumatic, mechanical or electric, which directly moves the mobile arm and end, in which the clamp is then said to be a C- or J-clamp, as shown in the appended FIG. 1, or the first degree of freedom is a rotation of the mobile arm and end, around a pin on the frame, with respect to the stationary arm holding the stationary end, in which the clamps are then said to be X- or scissor-clamps, and in which the welding actuator can be a linear actuator, of the cylinder type, either mounted pivotably by its body on the frame (appended FIG. 2a) around a pin parallel to the pivot pin of the mobile arm and end, or attached rigidly to this same frame (appended FIG. 2b), in which a suitable mechanical connection with two degrees of freedom then enables the rod of the cylinder moving linearly to follow the pivoting movements of the mobile arm around the pivot pin. The pivot force of the mobile arm and end is transmitted from the actuator to the mobile arm by a lever, to which the mobile arm is secured, pivoting around the pivot pin, and on which the end of the rod of the actuator pivots, as shown in the appended FIGS. 2a and 2b.

In FIGS. 1 to 11, the same references designate identical or equivalent components in the C- and X-clamps.

Figure 3:
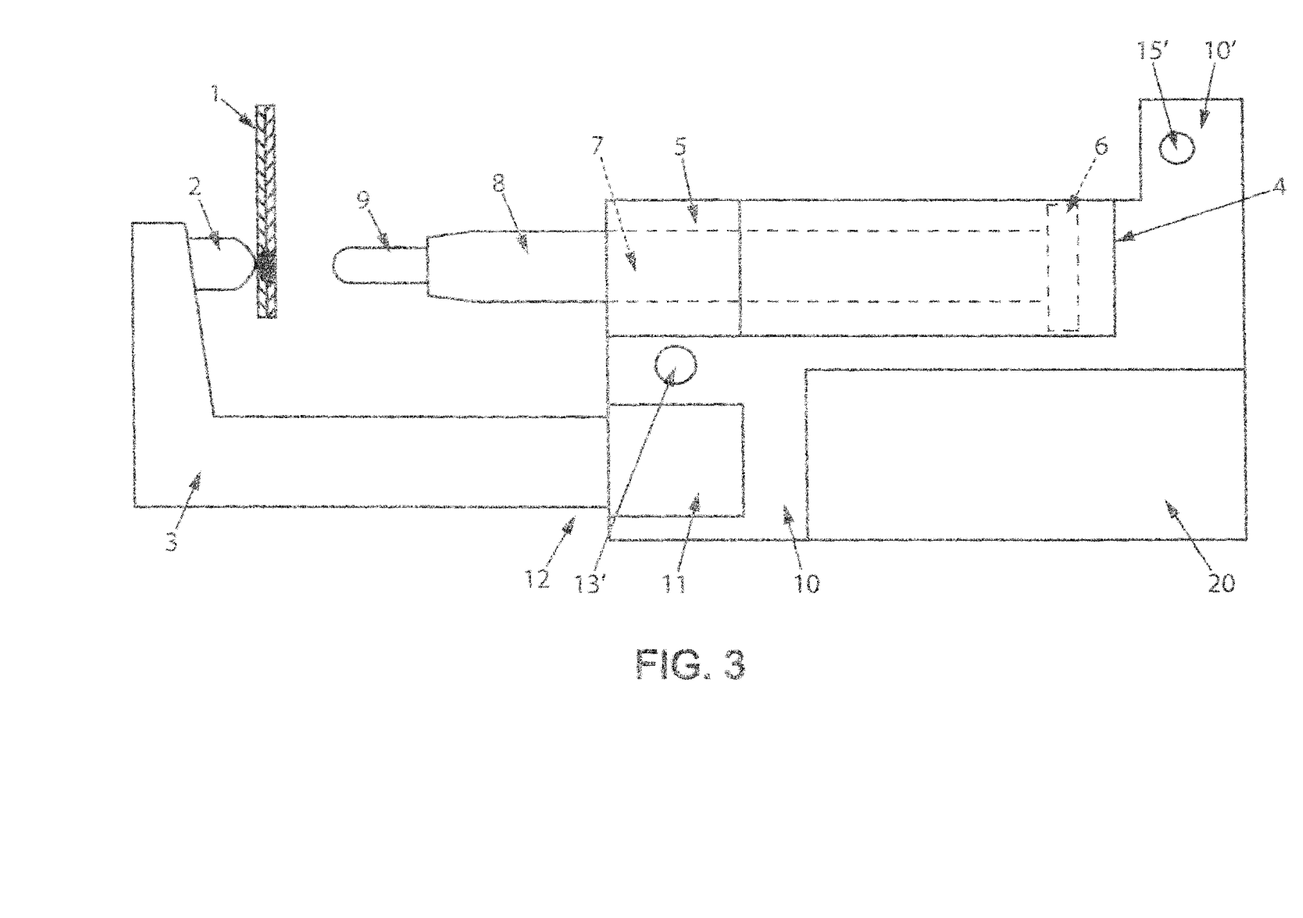
FIGS. 3, 4 and 5 are partial diagrammatic views, respectively lateral elevation, plan and frontal views, of a C-clamp of a line of clamps according to the invention.
Figure 4:
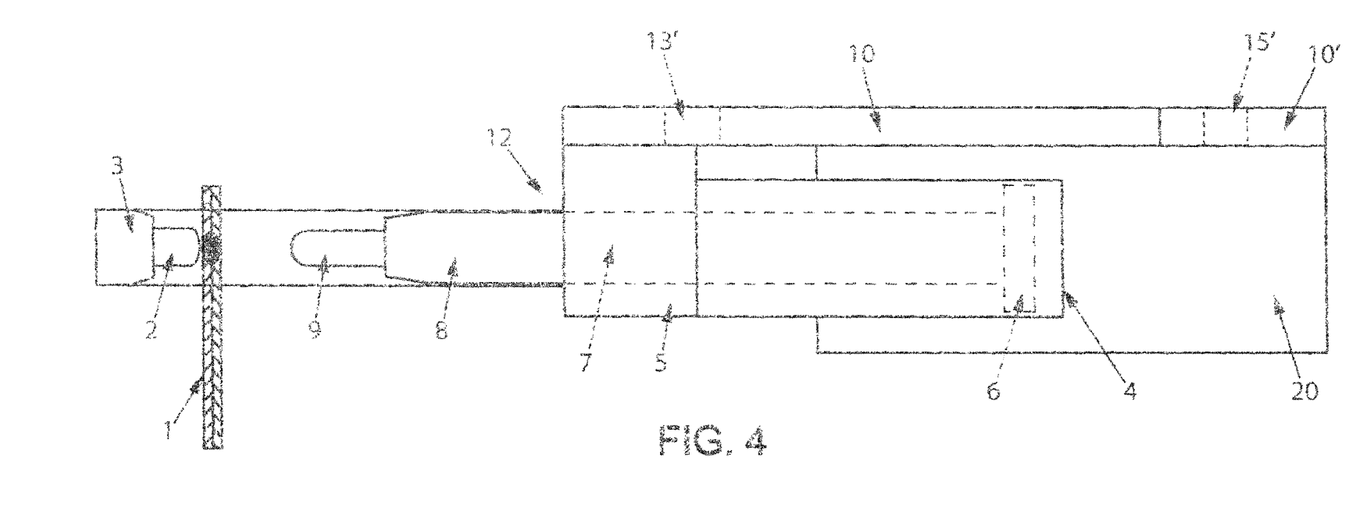
Figure 5:
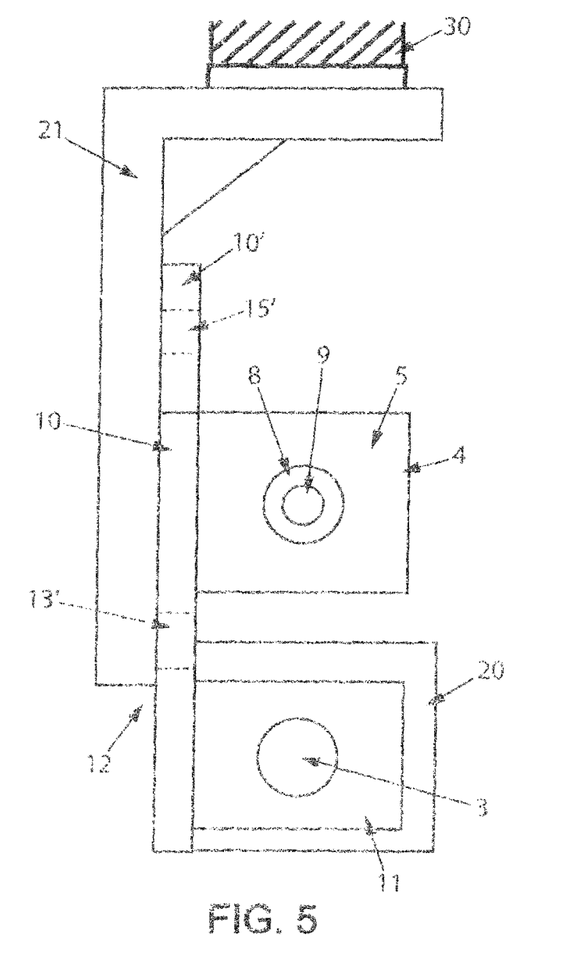

To ensure the electric spot welding of a sheet metal assembly 1, the C-clamp of the prior art according to FIG. 1, like that of the invention according to FIGS. 3, 4 and 5, includes primarily a stationary end electrode 2 mounted at the end of a stationary arm 3 secured to a support frame 10 of a welding actuator 4, for example of the pneumatic cylinder type, of which the piston 6 and the rod 7 are secured in movement to a mobile arm 8, in the extension of the rod 7, and of which the free end supports a mobile end electrode 9. These components form a so-called articulation subassembly 12 rigidly connected to a manipulating robot or a rigid foot, 30, called a support element.

Figure 2A:
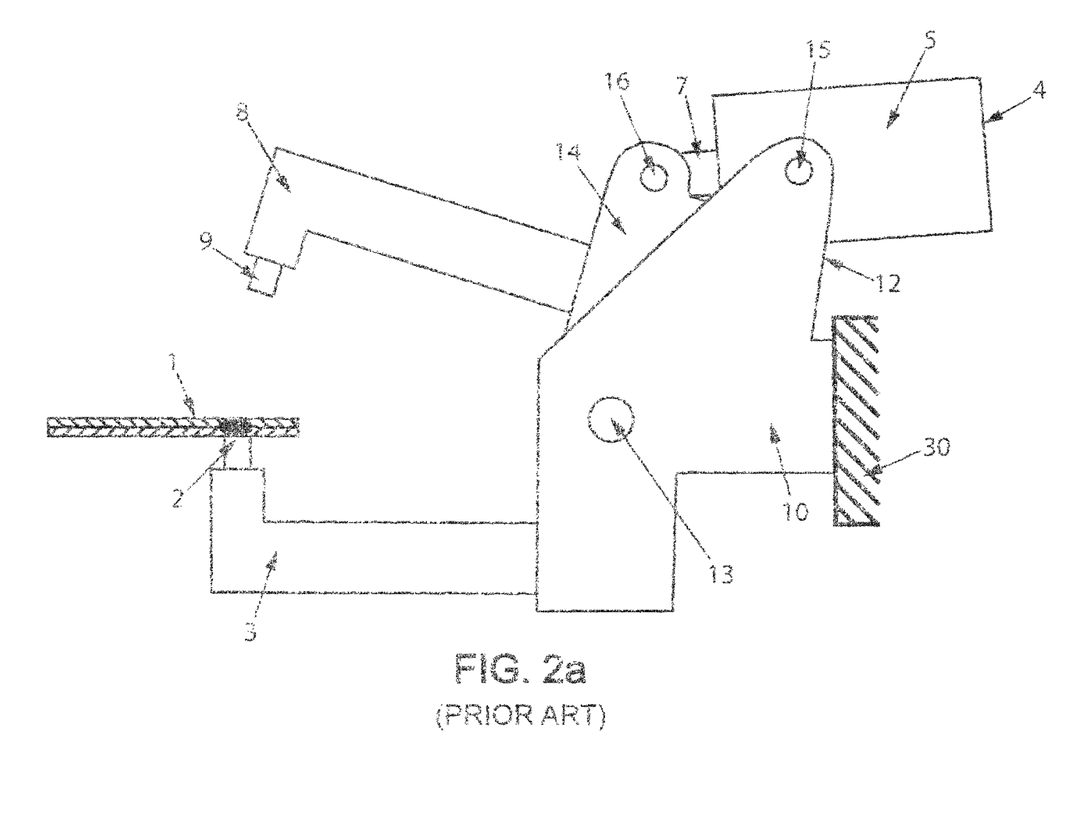
FIGS. 2a and 2b are views similar to that of FIG. 1 of two alternatives of the X-clamps of the prior art, described above.
Figure 6:
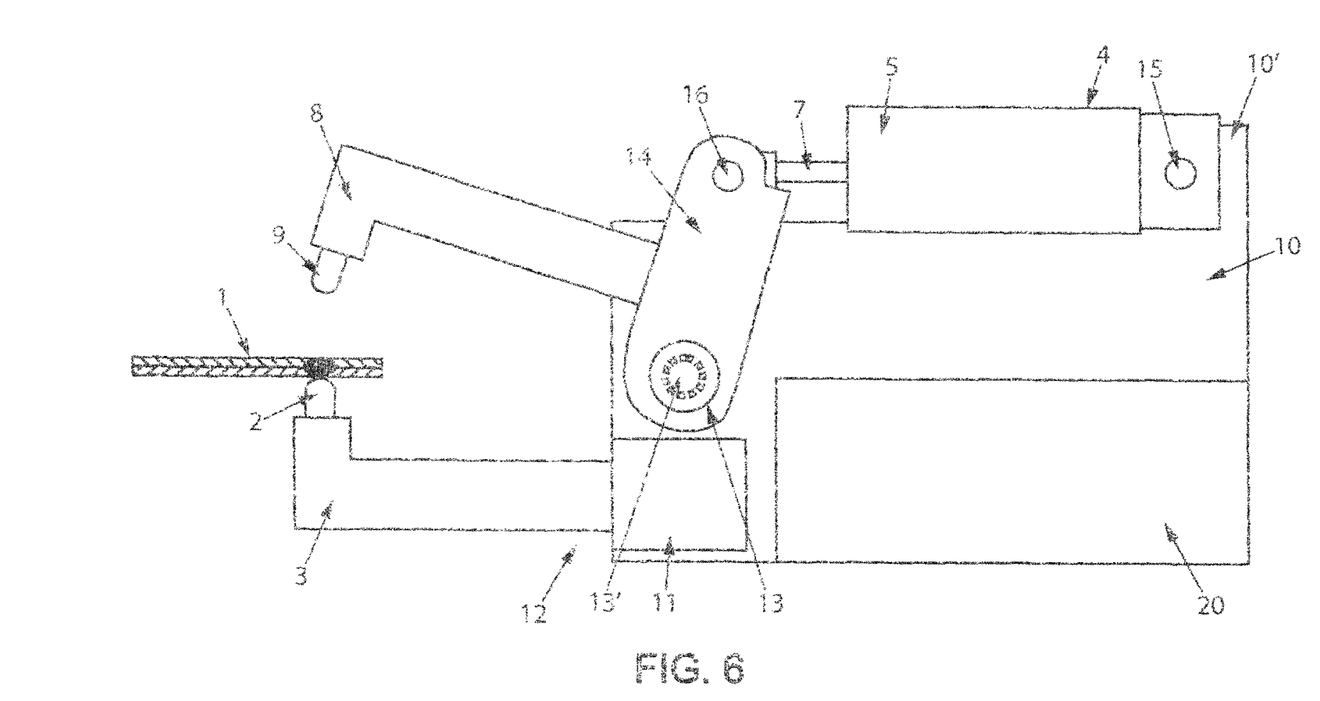
FIGS. 6, 7 and 8 are partial diagrammatic views similar to those of FIGS. 3, 4 and 5 of an X-clamp, on the basis of a frame similar, and ideally identical, to that of the C-clamp of FIGS. 3, 4 and 5 and belonging to the same line of clamps.
Figure 7:
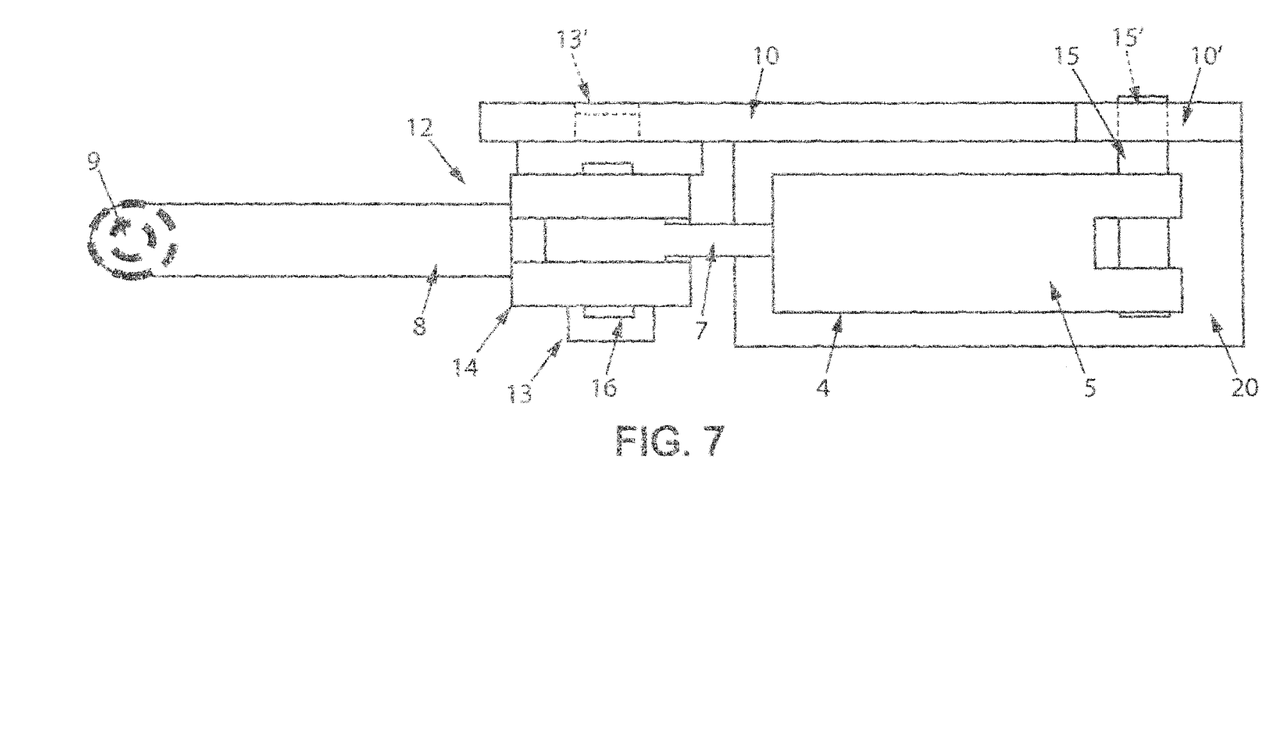
Figure 8:
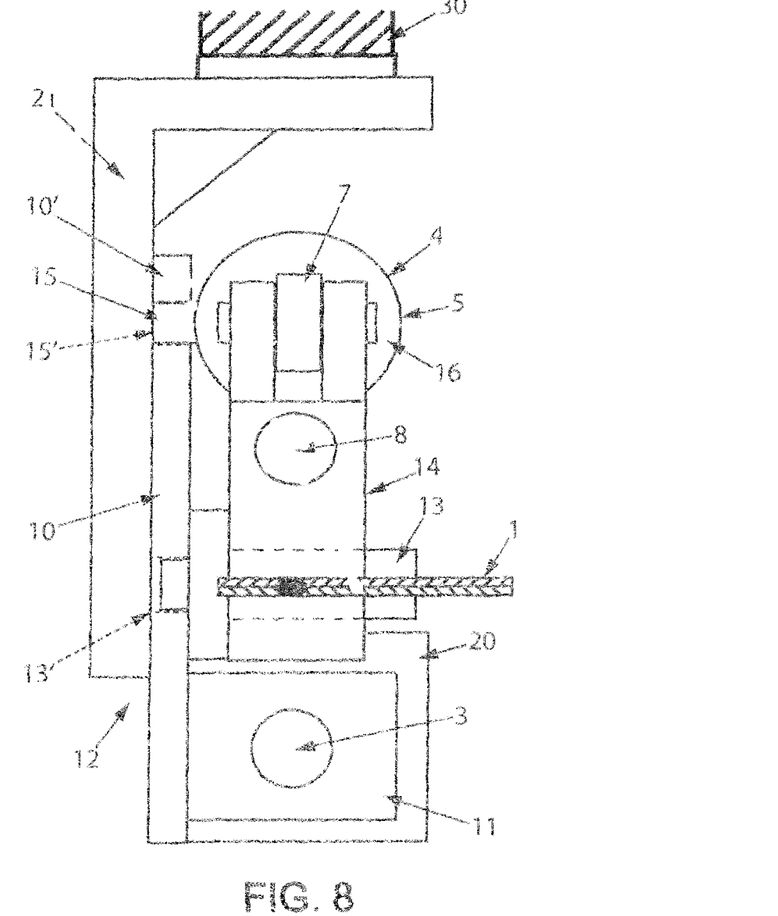

Similarly, in the X-clamp of the prior art according to FIG. 2a, like that of the invention according to FIGS. 6, 7 and 8, the stationary end electrode 2 and the stationary arm 3 are secured to a frame 10 in which a pivot pin 13 is mounted, around which a rigid lever 14 supporting the mobile arm 8 and the mobile end electrode 9 pivots, in which the welding actuator 4, also linear, pivots by its body 5 on the frame 10 around a pin 15 parallel to pin 13, while the free end of the rod 7 of the actuator 4 actuates the lever 14, on which the rod 7 pivots around a pin 16 also parallel to pin 13 and connected to the lever arm 14, so as to control the pivoting of the arm 8 and electrode 9 mobile in rotation around the pin 13 with respect to the arm 3 and end 2 stationary with respect to the frame 10 of the tool. As for the C-clamp described above, these components form a so-called articulation subassembly 12 rigidly connected to a manipulating robot or a rigid foot 30, called a support element.

Figure 2B:
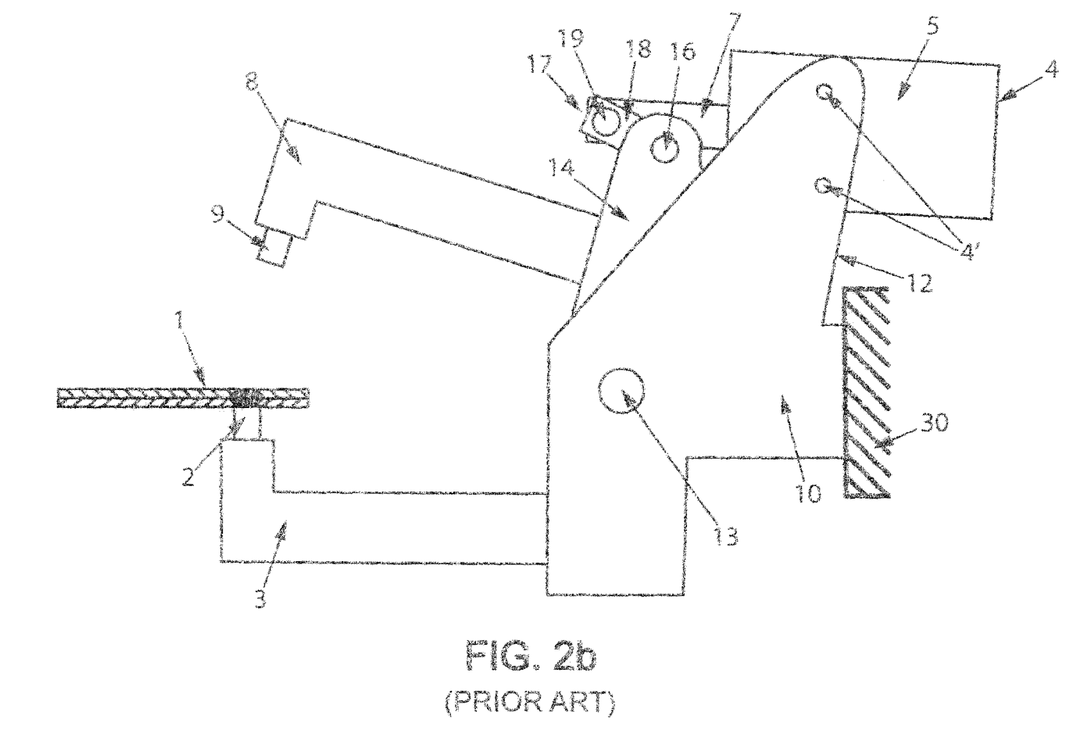
Figure 10:
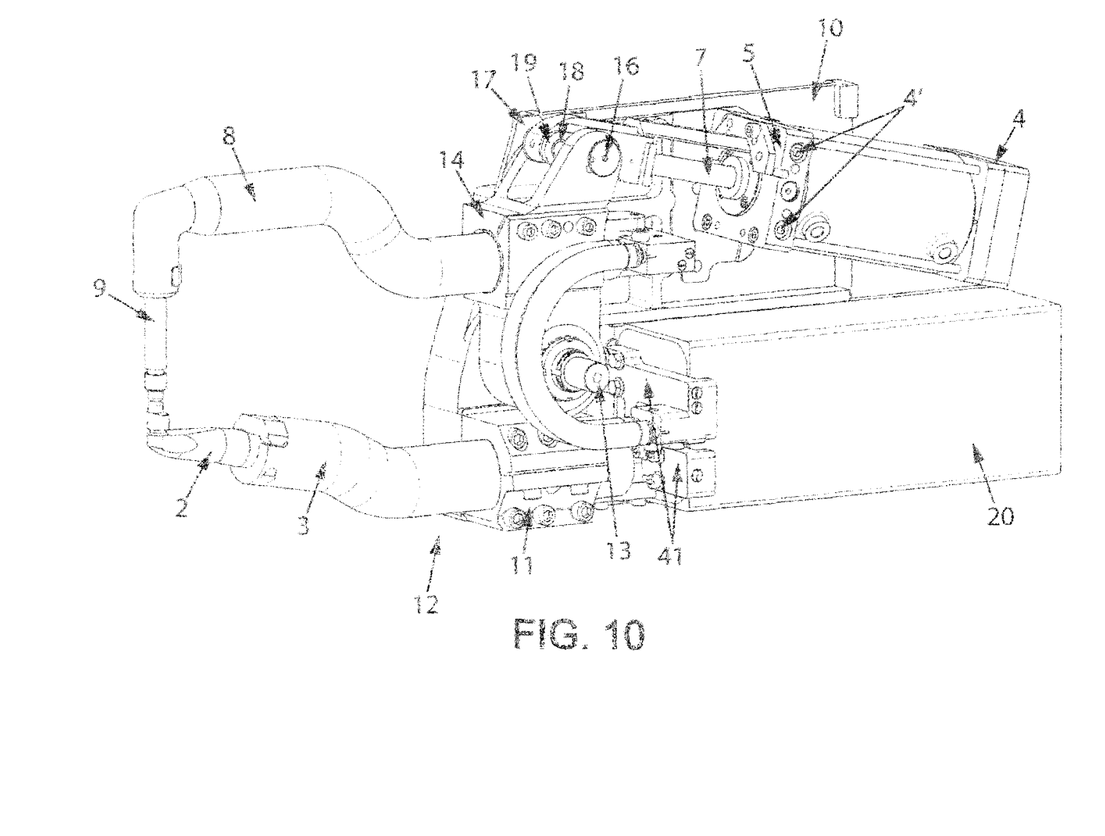

In a variant of the X-clamp according to the prior art and according to the invention, and as shown, respectively, in FIGS. 2b and 10, the rotation of the rigid lever 14 supporting the mobile arm 8 and the mobile end 9 around the pivot pin 13 is controlled by an always-linear welding actuator 4, rigidly attached by its body 5 and the attachments 4', such as screws, to the frame 10. A suitable mechanical connection 17 with two degrees of freedom, such as, for example, a connecting link system 18 mounted at the free end of the rod 7 and in rotation on said rod 7 by a first pin 19 parallel to pin 13 and by a second pin 16 also parallel to pin 13, on the lever arm 14, so as to control the pivoting of the arm 8 and end 9 mobile in rotation around the pin 13 with respect to the arm 3 and end 2 stationary with respect to the frame 10 of the tool, during translation movements of the rod 7 of the welding actuator 4. As for the 2 C- and X-clamp variants described above, these components form a so-called articulation subassembly 12, rigidly connected to a manipulating robot or a rigid foot, 30, called a support element.

The mechanical connection between the articulation subassembly 12 and the support element 30 can be produced:
either directly as in FIGS. 2a and 2b, or by means of one or more components forming a rigid assembly and which may or may not be part of the tool. FIG. 1 shows the possibility of a connection by means of at least one other rigid component 20 which may or may not be part of the clamp.

This component 20 can be, for example, in a non-limiting manner, a welding transformer when it is integrated in the clamp, a tool changer or a balancing cassette as described in the French patent application 06 04384 filed in the name of the ARO company.

According to the prior art, the design of welding clamps provides great diversity to frames, depending on the articulation subassembly used. However, no design makes it possible, for a line of clamps including C- and X-clamps, to use a frame with a similar design making it possible to obtain, according to different size and/or kinematics models (C- or X-clamp), synergy in the supply and management of said component.

An objective of the invention is to overcome this disadvantage, and to provide means for producing a clamp and a line of clamps for gripping sheet metal, which are more suitable for the various requirements of the field than similar clamps and lines of clamps of the prior art.

SUMMARY OF THE DISCLOSURE

The invention thus proposes a clamp for gripping sheet metal of the general type presented above, used in association with a manipulating arm or robot, and including a rigid frame, connected to a support element, such as a rigid foot or said robot, an articulation subassembly, itself comprising a first so-called stationary arm and a second so-called mobile arm, and a main actuator, bearing against said frame supporting said stationary arm, and capable of moving the mobile arm, with respect to the stationary arm, according to a first degree of freedom, in translation or in rotation, so as to close or open the clamp, in order, respectively, to grip a sheet metal assembly, between the stationary and mobile arms, or to release the sheet metal assembly, and which is characterised in that the clamp belongs to a line of clamps including clamps with C-type kinematics and clamps with X-type kinematics, and the frame has a shape and appearance similar for all of the clamps of said line of clamps.

Advantageously, the frame can be used as a means for attaching a support or any other component or assembly of mechanical components enabling a rigid connection to be ensured between said frame and the support element, such as a manipulating arm or a stationary rigid foot.

In a manner known per se, the clamp may not have a balancing/relief function.

When the clamp is an X-clamp, in which the rotation of a rigid lever supporting the mobile arm and its mobile end around a pivot pin is controlled by said main actuator, which is linear, according to a first variant, the latter can pivot by its body on the frame around a pin parallel to the pivot pin, while the free end of the actuator rod actuates the lever, on which the rod pivots around another pin also parallel to the pivot pin and connected to the lever arm, so as to control the pivoting of the arm and end mobile in rotation around the pivot pin with respect to the arm and end stationary with respect to the frame of the X-clamp.

According to a second variant of this X-clamp, the main linear actuator is rigidly attached by its body and attachments, such as screws, to the frame, in which a mechanical connection with two degrees of freedom, such as a connecting link system mounted in rotation on the free end of the rod by a first pin parallel to the pivot pin, and on the lever arm by a second pin also parallel to the pivot pin, is capable of controlling the pivoting of the arm and end mobile in rotation around the pivot pin with respect to the arm and end stationary with respect to the frame of the clamp during translation movements of the rod of the main actuator.

In addition, in the case of an X-clamp, at least one of the rotation pins (of the rigid lever and the actuator on the frame) can be attached to the frame by a single one of its ends according to a cantilevering assembly.

Whether the clamp is a C- or an X-clamp, the frame may consist of a rigid assembly of parts, or, alternatively, be made in one piece.

For the clamps of both the C- and X-type kinematics, the frame can be used for positioning and attachment of components of the articulation subassembly, and the frame can itself form a part of it in the case of a clamp without a balancing/relief function.

In addition, the frame can be used for positioning and attachment of other components of the clamps not belonging to the articulation subassembly.

In another advantageous embodiment with regard to modularity and simplicity, the frame is in the form of a lateral flank.

Indeed, in this case, the clamp can be a modular clamp, with a plurality of components and/or subassemblies other than the frame, and which are common to the various clamps of said line.

In these various embodiments, it is particularly advantageous for the frame to be identical for all of the clamps of the line.

The clamps can advantageously be resistance welding clamps, in which case the ends, respectively, of the stationary and mobile arms are welding electrodes, and in which a welding transformer is then preferably integrated in the clamp and also attached to the frame.

The invention also relates to a line of clamps for griping sheet metal, which line is characterised in that it includes a plurality of clamps as defined above, of which at least one clamp is a C-clamp and of which at least another is an X-clamp, in which all of the clamps of the line have frames of similar, and preferably identical, shape and appearance.

The invention relates more specifically to a line of X- and C-clamps as presented above, in which the frame has a similar design and structure among a plurality of clamp models differing from one another by shape, appearance, size, grip load capacity, and/or kinematics of the mobile arm (C- or X-clamp), so as to enable synergy in the supply and management of frames.

The invention very specifically relates to a design in which the frame is common (same component reference) to an entire line of resistance welding clamps including clamps with both X- and C-kinematics.

There are many advantages to a design using a similar, and preferably identical, frame. Thus, in a non-limiting manner, such a design allows for significant synergy and simplifications in the supply, management and storage of components of a line of clamps. Moreover, the invention promotes the use of numerous other common components among the various clamp sizes and allows for good modularity of the clamps.

In addition, this design easily enables, for all or part of the line of clamps considered, common assembly operations, stations and assembly equipment, and very specifically independently of the kinematics of the clamp (C- or X-clamp).

BRIEF DESCRIPTION OF THE DRAWINGS

Other advantages and features of the invention will become clear from the following description, provided for non-limiting purposes, of examples of embodiments described in reference to the appended drawings, in which:

FIGS. 3 to 11 are views representing examples of clamps according to the invention, among which:

DETAILED DESCRIPTION OF THE DISCLOSURE

FIG. 3 shows, from a side view, a C-clamp with, in order to ensure electrical spot welding of a sheet metal assembly 1, a stationary end electrode 2 mounted at the end of a stationary arm 3, which, by means of a fitting support 11, is rigidly connected to a frame 10, produced in the form of a lateral flank, supporting, in a cantilever above the support 11, the body 5 of a welding actuator 4, of which the rod 7 is secured in movement to a mobile arm 8, in the extension of said rod 7, and of which the free end supports a mobile end electrode 9, so that the frame 10 takes up the gripping or welding forces of the clamp. These components form a so-called articulation subassembly 12, rigidly connected to a support element 30 shown in FIG. 5.

FIG. 4 shows the same C-clamp as FIG. 3, but from a top view, which clearly shows the cantilever support, on a same face of the frame 10, of the body 5 of the actuator 4 and a welding transformer 20, under the actuator 4 and behind the support 11.

FIG. 5 shows the same C-clamp as FIGS. 3 and 4, seen from the front, with, in this figure, the articulation subassembly 12, rigidly connected to the support element 30, by means of a corner plate support 21, laterally attached to the frame 10, on the face opposite that supporting the support 11, the welding transformer 20 and the actuator 4.

These FIGS. 3, 4 and 5 also show two orifices or drillings 13' and 15' produced in the frame 10, respectively between the attachments of the support 11 and the body 5 of the actuator 4 on the frame 10 and in the upper and rear extension 10' of the frame 10, and which are necessary for the use of this same frame 10 on the X-clamp(s) of the same line of clamps, as described below in reference to FIGS. 6, 7 and 8.

FIG. 6 shows, from a side view, an X-clamp with, in this example, the stationary end electrode 2 and the stationary arm 3, which, by means of a fitting support 11, are rigidly connected to the frame 10 (the same as that of the clamp of FIGS. 3, 4 and 5) in which a pivot pin 13 is mounted (housed in the orifice 13') around which a rigid lever 14 pivots, supporting the mobile arm 8 and the mobile end electrode 9, in which the welding actuator 4, also linear, pivots by its body 5 on the frame 10 around a pin 15, housed in the orifice 15' of the extension 10' and parallel to the pin 13, while the free end of the rod 7 of the actuator 4 actuates the lever 14, on which the rod 7 pivots around a pin 16 also parallel to the pin 13, so as to control the pivoting of the arm 8 and end electrode 9 mobile in rotation of the lever 14 around the pin 13, with respect to the arm 3 and end electrode 2 stationary with respect to the frame 10 taking up the welding forces, and attached to the support element 30 (stationary foot or manipulating robot).

FIGS. 7 and 8 show the same X-clamp as FIG. 6, seen respectively from a top view and a frontal view, with, in FIG. 8, the articulation subassembly 12 rigidly connected to the support element 30 by means of a rigid corner plate support 21, laterally attached to a face of the frame 10, which is opposite the face on which the support 11, the welding transformer 20 and the actuator 4 are mounted in cantilever form. Thus, these pivot pins 13 and 15 of the lever 14 and the body 5 of the actuator 4 on the frame 10 of the X-clamp can be mounted in cantilever form on the frame 10, as shown in FIGS. 7 and 8 (pins 13 and 15 hold on the frame 10 by a single one of their ends). Alternatively, these pins 13 and 15 can be mounted by their two ends with a U-shaped frame, also capable of being used for the assembly of the articulation subassembly 12 of the C-clamp of FIGS. 3, 4 and 5, in another line of clamps according to the invention.

The fact that the frame 10 is common to the C- and X-clamps of FIGS. 3, 4, 5 and 6, 7 and 8 can be seen in particular by the presence, in the frame 10 of the C-clamp of FIG. 3, of the orifices 13' and 15' which enable the placement, on the X-clamp of FIGS. 6, 7 and 8, of the rotation pins 13 and 15 necessary in the case of the kinematics of the X-clamp shown.

Figure 9:
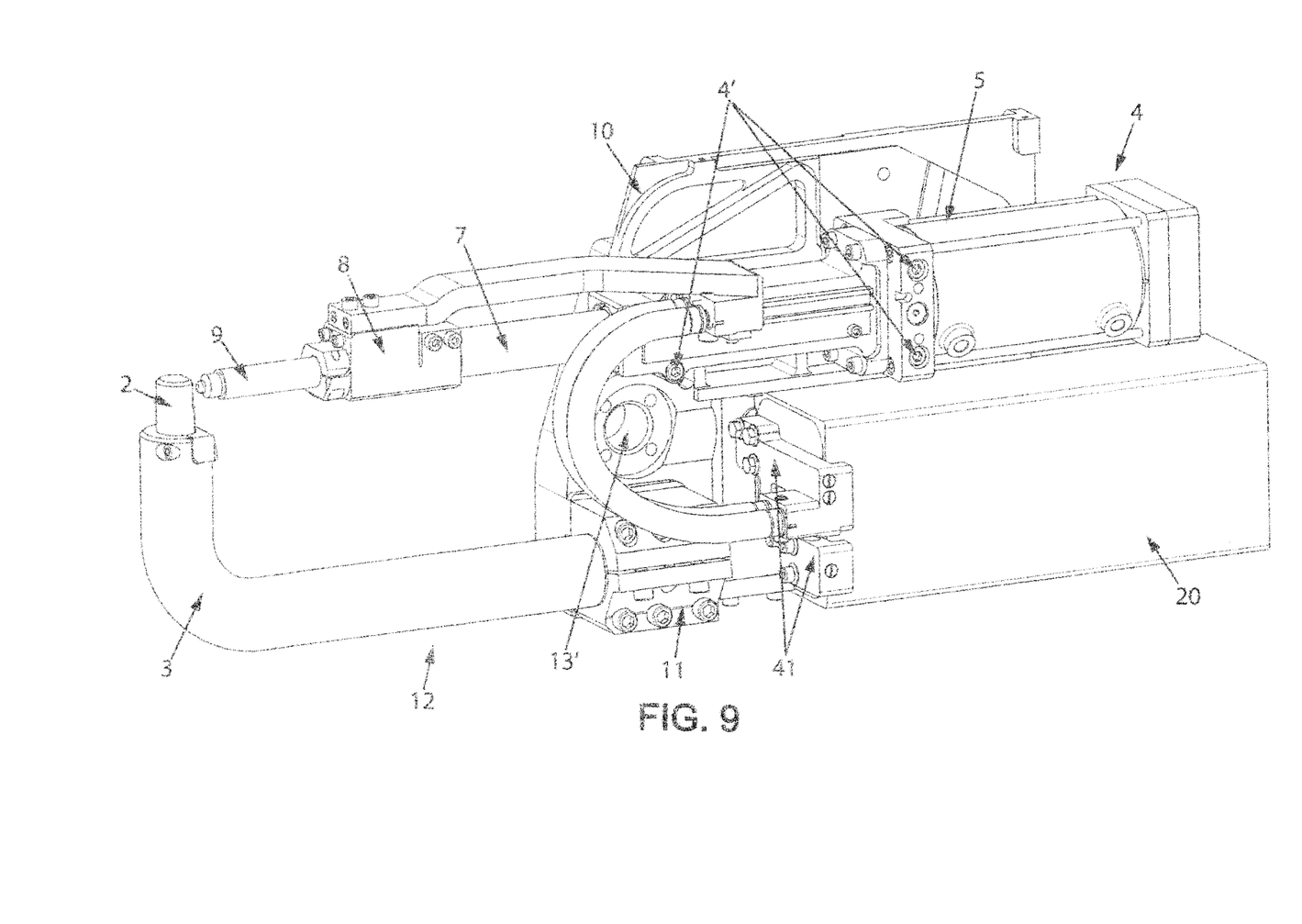
FIGS. 9, 10 and 11 are perspective views showing an example of clamps of different C- and X-kinematics, respectively, in FIGS. 9 and 10, which, according to the invention, use a frame and a subassembly of parts according to FIG. 11, which are identical and common to the clamps of the same line.
Figure 11:
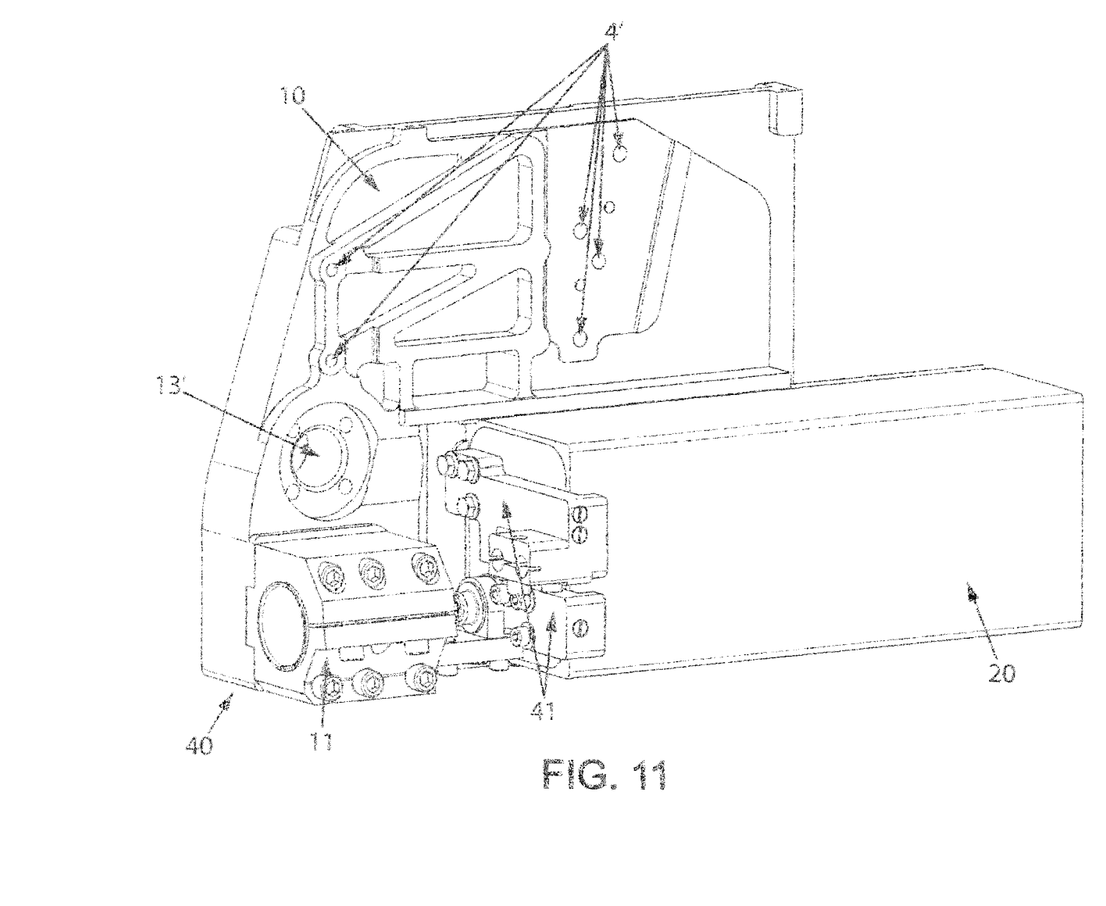

FIGS. 9, 10 and 11 show another example of a modular design of resistance welding clamps enabling, on the basis of a common identical or similar frame (FIG. 11) numerous common components to be found between two different clamp kinematics (X-clamp in FIG. 10 and C-clamp in FIG. 9).

FIG. 9 shows, in an isometric view, a welding C-clamp with a stationary end electrode 2 mounted at the end of a stationary arm 3 that, by means of a fitting support 11, is rigidly connected to a frame 10 in the form of a lateral flank, with a welding actuator 4 also rigidly connected to the frame 10 by attachments 4', such as screws, and of which the rod 7 is secured in movement to a mobile arm 8, in the extension of said rod, and of which the free end supports a mobile electrode 9. These components form a so-called articulation subassembly 12, rigidly connected to a support element 30, as shown in FIG. 5. Like the support 11 and the actuator 4, a welding transformer 20 is screwed or bolted in cantilever form to a lateral face of the flank forming the frame 10, which takes up the gripping or welding forces of the clamp.

FIG. 10 shows, in an isometric view, a welding X-clamp with, in this example, a welding electrode at the stationary end 2 of the stationary arm 3, which, by means of the same fitting support 11, is rigidly connected to the same frame 10 as in the case of FIG. 9. In this same frame 10, a pivot pin 13 is mounted (housed in the orifice 13' passing through the frame 10, see FIG. 9) around which a rigid lever 14 pivots, supporting the mobile arm 8 and the mobile end electrode 9, in which the welding actuator 4, also linear, is rigidly attached by its body 5 and attachments 4', such as screws, to a lateral face of the frame 10. A suitable mechanical connection 17, with two degrees of freedom, such as, for example, a connecting link system as described with reference to FIG. 2b, is mounted in rotation on a first pin 19, parallel to pin 13, at the free end of the rod 7 of the actuator 4, and on the lever arm 14 by a second pin 16, also parallel to the pin 13, so as to control the pivoting of the arm 8 and end electrode 9 mobile in rotation of the lever 14 around the pin 13, with respect to the arm 3 and end electrode 2 stationary with respect to the frame 10 of the tool, during translation movements of the rod 7 of the welding actuator 4.

In FIGS. 9 and 10, the clamps can be attached to a support element by means of the frame 10 or the welding transformer 20.

FIG. 11 is an isometric view showing a common frame 10, illustrating, on the basis of this frame, the modularity, simplifications and synergies which can be realized concerning numerous other common parts or common subassemblies 40 among the clamp models with different kinematics (C- and X-clamps of FIGS. 9 and 10) of the same line of clamps.

Thus, aside from the welding transformer 20, we have, as common parts, the fitting support 11 of the stationary arm (not shown), as well as other parts such as conductors 41, connected to the transformer 20 and ensuring electrical continuity between the terminals of the secondary of said transformer and the welding electrodes 2 and 9, as described in the French patent application 06 02073 in the name of the ARO company.

Similarly, as the frame 10 is common, it becomes easier to standardize the supports 21 or other mechanical components capable of being involved in the connection between the tool and its support element 30.

The invention claimed is:

1. A rigid frame having a lateral flank defining one side thereof, wherein the lateral flank is configured to alternately support a first subassembly and a second subassembly, wherein each subassembly can be interchangeably mounted to the lateral flank, wherein the first subassembly includes at least one clamp associated with C-type kinematics, and the second subassembly includes at least one clamp associated with X-type kinematics, the rigid frame comprising:
    at least one orifice configured to support a pivot pin in the orifice about which a rigid lever and attached mobile arm can be pivoted with respect to the clamp associated with X-type kinematics; wherein the lateral flank is configured to support the clamp associated with C-type kinematics as a linearly translatable subassembly; and wherein the opposite side of said frame is configured to be connected to an associated support element;
    wherein each respective interchangeable clamp defines a movable subassembly having components that include:
    a first stationary arm,
    a second mobile arm, and
    a main actuator configured to bear against the lateral flank supporting said stationary arm and capable of moving said mobile arm with respect to said stationary arm according to a first degree of freedom, regardless of whether in translation or rotation, so as to close or open the respective clamp, wherein all components of each respective movable subassembly are directly mountable only to the one lateral flank side of the frame.

2. The rigid frame according to claim 1, wherein said frame is used as means for attaching a support or an assembly of mechanical components providing a rigid connection between said frame and said support element.

3. The rigid frame according to claim 1 in which at least one clamp is deprived of any balancing/relief means.

4. The rigid frame according to claim 1 wherein at least one clamp is an X-clamp comprising a rigid lever supporting the mobile arm and its mobile end, in which the rotation of the rigid lever around a pivot pin mounted in the orifice is controlled by said main actuator, which is linear, pivoting by a body on said frame around a pin mounted to a second orifice of the frame and parallel to said pivot pin, while a free end of a rod of said actuator actuates said rigid lever, on which said rod pivots around another pin also parallel to said pivot pin and connected to said lever arm, so as to control the pivoting of said mobile arm and end mobile in rotation around said pivot pin with respect to said stationary arm having a stationary end stationary with respect to said frame of the X-clamp.

5. The rigid frame according to claim 1 wherein at least one clamp is an X-clamp comprising a rigid lever arm supporting said mobile arm and its mobile end, in which the rotation of the rigid lever arm around a pivot pin mounted in the orifice is controlled by said main actuator which is linear, rigidly attached by a body and attachments on said frame, in which a mechanical connection with two degrees of freedom, mounted in rotation on a free end of a rod of said actuator by a first pin parallel to said pivot pin and on said lever arm by a second pin also parallel to said pivot pin is capable of controlling the pivoting of said mobile arm and end mobile in rotation around said pivot pin with respect to said stationary arm and end stationary with respect to said frame of the clamp during translation movements of said rod of said main actuator.

6. The rigid frame according to claim 4 wherein at least one of the rotation pins of the X-clamp is attached to the frame by a single one of its ends according to a cantilever assembly.

7. The rigid frame according to claim 1 wherein said frame consists of a rigid assembly of parts.

8. The rigid frame according to claim 1 wherein said frame is formed in one piece.

9. The rigid frame according to claim 1 wherein said frame is used to position and attach components of said movable subassembly.

10. The rigid frame according to claim 1 wherein said frame is used to position and attach components of the clamp not forming part of said movable subassembly.

11. The rigid frame according to claim 1 wherein each clamp is a modular clamp, with a plurality of components other than said frame and which are common to the various clamps.

12. The rigid frame according to claim 1 wherein each clamp is a resistance welding clamp, and ends, respectively, of said stationary and mobile arms are welding electrodes and in which a welding transformer is integrated in the clamp and attached to said frame.

13. A line of clamps for gripping sheet metal, each clamp being used in association with a manipulating arm, and including:
    a rigid frame configured to be associated with a support element, and at least first and second interchangeable subassemblies, each subassembly comprising:
    a first stationary arm,
    a second mobile arm, and
    a main actuator bearing against said rigid frame supporting said stationary arm and capable of moving said mobile arm with respect to said stationary arm according to a first degree of freedom, in translation or rotation, so as to close or open the clamp, in order, respectively, to grip a sheet metal assembly between said stationary and mobile arms or release the sheet metal assembly, wherein the line of clamps includes at least one clamp with C-type kinematics and at least one clamp with X-type kinematics;
    wherein the rigid frame includes a lateral flank defining one side thereof, and the lateral flank is configured to alternately support the first subassembly and the second subassembly, wherein each subassembly can be interchangeably mounted to the lateral flank, wherein the first subassembly includes the clamp with C-type kinematics, and the second subassembly includes the clamp with X-type kinematics; the rigid frame having at least one orifice configured to support a pivot pin within the orifice about which a rigid lever and attached mobile arm can be pivoted with respect to the clamp associated with X-type kinematics; wherein the lateral flank is configured to support the clamp associated with C-type kinematics as a linearly translatable subassembly; and wherein the opposite side of said frame is directly connected to an associated support element.

* * * * *